United States Patent [19]

Horikiri

[11] Patent Number: 5,129,976
[45] Date of Patent: Jul. 14, 1992

[54] METHOD OF ADHERING A DECORATIVE SHEET ON A HOLLOW STRUCTURE

[75] Inventor: Yataro Horikiri, Tokyo, Japan

[73] Assignee: Sakura Hobby Craft Co., Ltd., Tokyo, Japan

[21] Appl. No.: 662,711

[22] Filed: Mar. 1, 1991

[30] Foreign Application Priority Data

Sep. 28, 1990 [JP] Japan .................................. 2-260666

[51] Int. Cl.$^5$ .......................... B32B 31/04; B32B 31/18
[52] U.S. Cl. ..................................... 156/213; 156/215; 156/248; 156/249; 156/289; 156/293; 156/DIG. 3
[58] Field of Search ......... 156/247, 248, 249, DIG. 3, 156/DIG. 4, 215, 289, 213, 293, 212, 227; 53/214

[56] References Cited

U.S. PATENT DOCUMENTS 2,489,837 11/1949 Von Hofe ............................ 156/289
3,881,042 4/1975 Ungerer ........................... 156/289 X
3,925,585 12/1975 Aoyagi ............................... 283/74 X
4,292,102 9/1981 Bidegain ............................... 156/213

Primary Examiner—Michael W. Ball
Assistant Examiner—Michele K. Yoder
Attorney, Agent, or Firm—Fleit, Jacobson, Cohn, Price, Holman & Stern

[57] ABSTRACT

A method of adhering a decorative paper to a cubic structure such as a box. A double-face adhesive sheet is prepared to have an upper and lower release papers, and the lower release paper is entirely peeled off to adhere thereto a decorative paper. A cut is formed on the upper release paper to form a desired shape of non-adhesive portion and surrounding adhesive portion. The upper release sheet at the surrounding adhesive portion is peeled off and the cubic structure is positioned on the non-adhesive portions. Then, the adhesive portion is bent inside of the cubic structure and adhered to the interior of the cubic structure.

3 Claims, 3 Drawing Sheets

METHOD OF ADHERING A DECORATIVE SHEET ON A HOLLOW STRUCTURE

BACKGROUND OF THE INVENTION

The present invention relates to formation of a decorative surface of a three-dimensional structure and more particularly to a method of adhering a desired decorative paper or sheet on a box-like article such as a cardboard box, wood or metal box or box-like cubic articles. The present invention provides an accurate positioning of the box-like articles on the decorative sheet for succeeding adhering process.

Conventionally, when a decorative sheet is adhered to a surface of a cubic article such as a cardboard box or tube, an adhesive agent is coated entirely on a back surface of a decorative paper by spread coating technique, followed by sticking in a preliminary way a release paper on the adhesive agent layer. In use, the release paper is stripped off from the layer of adhesive agent and then the cubic article is accurately positioned on a predetermined position by a visual judgement so that the decorative paper is entirely adhered to the entire surface of the cubic article.

However, in the conventional method in which the release paper is entirely peeled off from the adhesive layer, it is rather difficult to position the cardboard cubic article in on an accurate position. If the cubic article is once placed on the adhesive surface inaccurately, it is quite difficult to correct the position. If the cubic article erroneously adhered to the adhesive layer of the decorative paper is forcibly peeled off from it, some of the fibers of cardboard are left on the adhesive layer, with the result that the portions where the fibers are left are not available for adhesion. Accordingly, the conventional method requires substantial experience and difficulty.

SUMMARY OF THE INVENTION

An object of the present invention is to provide an improved method of adhering a decorative paper on a cubic article, which permits an easy and accurate positioning of the cubic article on the decorative paper.

Another object of the present invention is to provide a new method of forming a cubic article, which permits an easy correction of the position placed on the decorative paper.

A further object of the present invention is to provide a new method of adhering a decorative paper on a cubic article in which an adhesive portion of the decorative paper is formed so that it is positioned on an inner portion of the cubic article.

Another object of the present invention is to provide an improved method of adhering a decorative paper on a cubic article without any sacrifice of appearance.

According to the present invention, there is provided a method of adhering a decorative paper on a surface of a cubic article, comprising the steps of: preparing a double-surface adhesive sheet having an upper release paper on one surface and a lower release paper on the other surface, peeling off said lower release paper from said double-surface adhesive sheet to form a vacant area, adhering a back surface of a decorative paper to said vacant area, wherein a cut or cuts confining a pre-determined shape are formed to said upper release paper to thereby form a central non-adhesive portion and a peripheral adhesive portion, peeling off said upper release paper from said double-surface adhesive sheet at said adhesive portion so that the adhesive agent of the adhesive portion is exposed, positioning accurately said cubic article on said non-adhesive portion, and folding said peripheral adhesive portion of the decorative paper toward the inside of said cubic article whereby only said adhesive portion of the decorative paper is adhered to an inner side, or interior, of said cubic article.

PREFERRED EMBODIMENT OF THE INVENTION

Figure 1:
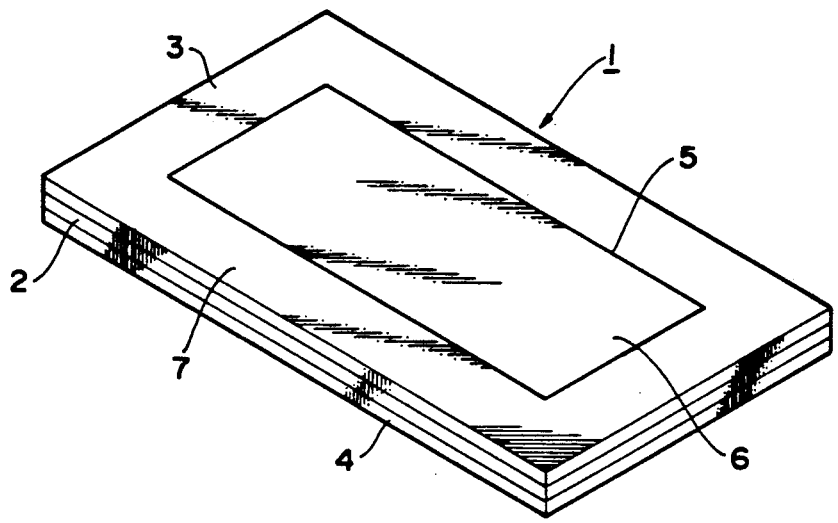
FIG. 1 is a perspective view of a three-layered adhesive body used for the method of the present invention.
Figure 2A:
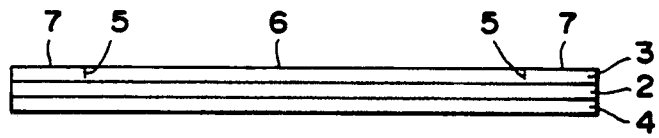
FIGS. 2A, 2B, 2C and 2D are diagrams showing the steps of carrying out the method of the present invention.
Figure 2B:
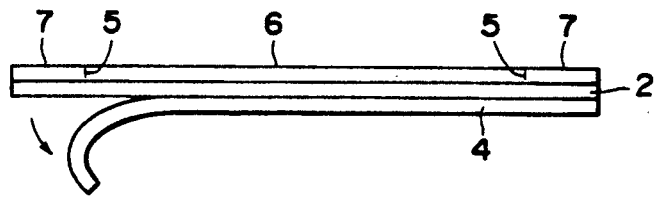
Figure 2C:
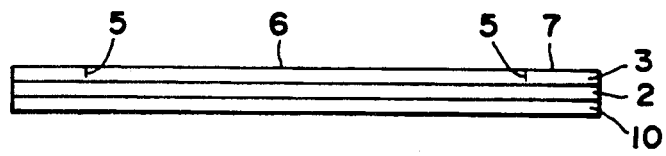

Referring first to FIG. 1, an adhesive body 1 has a pressure sensitive double-face, or double coated, adhesive sheet 2 having upper and lower adhesive layers with an upper release paper 3 on an upper surface and a lower release paper 4 on a lower surface. Importantly, the upper release paper 3 is provided with a cut or cuts 5 in correspondence with a shape and dimension of a cubic article such as a cardboard box to be covered with a decorative paper, so that a central non-adhesive portion 6 and a surrounding adhesive portion 7 are formed as will be described presently. With reference to FIGS. 2A through 2D, the lower release paper 4 of the adhesive body 1 in FIG. 2A is peeled off as shown in FIG. 2B and then a pre-selected decorative paper 10 is adhered to the adhesive surface as shown in FIG. 2C, which can be carried out easily since both the decorative paper and the adhesive body are in the plate-like structure having a flat surface.

Figure 2D:
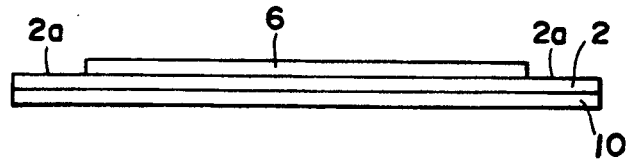
Figure 3:
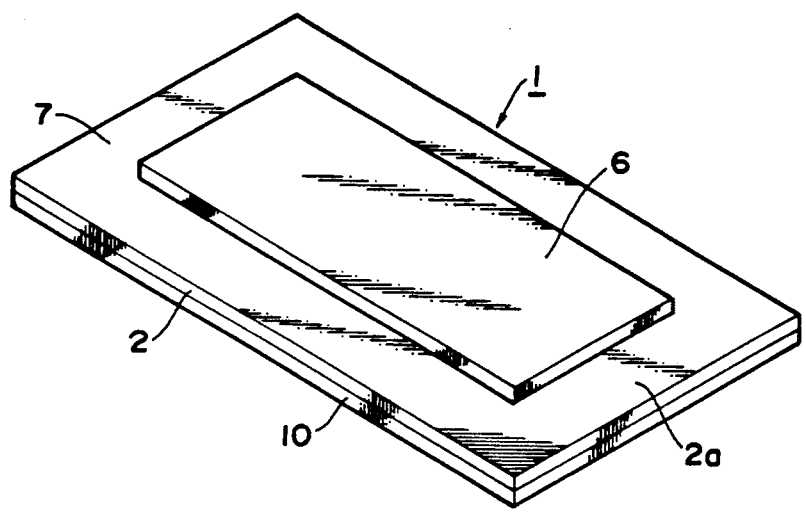
FIG. 3 is a perspective view of the adhesive body showing the step of FIG. 2D.

Then the adhesive portion 7 of the upper release paper 3 is peeled off along the cut 5 on the non-adhesive portion 6 so that the adhesive layer 2a of the double coated adhesive sheet 2 is exposed with the central non-adhesive portion 6 maintained, as shown in FIGS. 2D and 3. The cut 5 of the outline or the shape of the non-adhesive portion 6 is formed in accordance with the shape and dimension of a cubic article 11 (a rectangular box 11 in the embodiment of FIG. 4). Then the box 11 is placed on the non-adhesive portion 6 to visually determine an accurate position of same to be coextensive in length therewith. If the positioning is found to be in good order, the adhesive portion 7 with its adhesive layer exposed is bent inwardly into the interior of the box 11 and pushed against the inner surface of the box 11 to complete the formation or adhering of the decorative paper 10. Though not illustrated, small cuts can be formed at the portion corresponding to the corners of the box so that an accurate and finely shaped appearance of the decorative paper can be performed.

In the present invention, the cuts 5 and the non-adhesive portion 6 shown in FIG. 1 and 3 configured by the cuts 5 are formed in accordance with the shape and size of the box 11.

Figure 4:
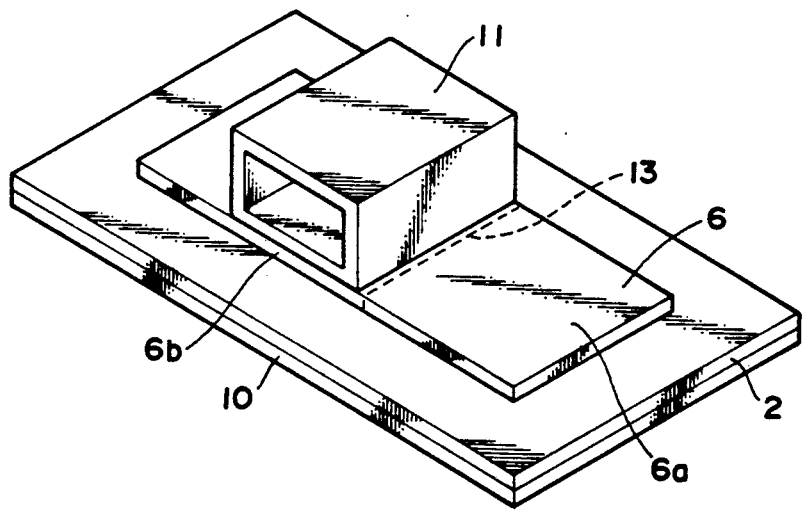
FIG. 4 is a perspective view of the adhesive body and a box as a cubic article positioned thereon for adhesion.

As shown in FIG. 4, it would be considered that a dotted cut or cuts 13 be formed on an appropriate portion or portions so that portion 6a of the non-adhesive portion 6 where the box is not contacted is first peeled off and then the portion 6a is adhered to the surface of the box, and thereafter the other portion 6b is peeled off to expose the adhesive layer of the double-face adhesive sheet 2 and adhered to the box 11 to complete the entire adhesion. In such a method, however, the upper release paper 3 must be entirely and completeley peeled off at the end and, therefore the decorative paper 10 is directly adhered to the surface of the box 11 through the thin double-face adhesive sheet 2. Thus, the base of the box possibly appears through the decorative paper 10 if the decorative paper is very thin as Japan paper, with the result of undesirable appearance.

On the contrary, according to the present invention, the central non-adhesive portion 6 of the upper release paper 3 is maintained per se, the non-adhesive portion 6 forms an appearance of the complete box covered with the decorative paper and, consequently, it can prevent the base pattern of the box from being seen, or appearing, through the decorative paper. Further, since only the adhesive portion 7 of the upper release paper 3 is peeled off to provide exposure of the adhesive agent at the portion of the surrounding adhesive portion only, the portion which is "adhered" to the box 11 is located in the interior of the box. Therefore, the desired decorative appearance is not damaged.

Figure 5:
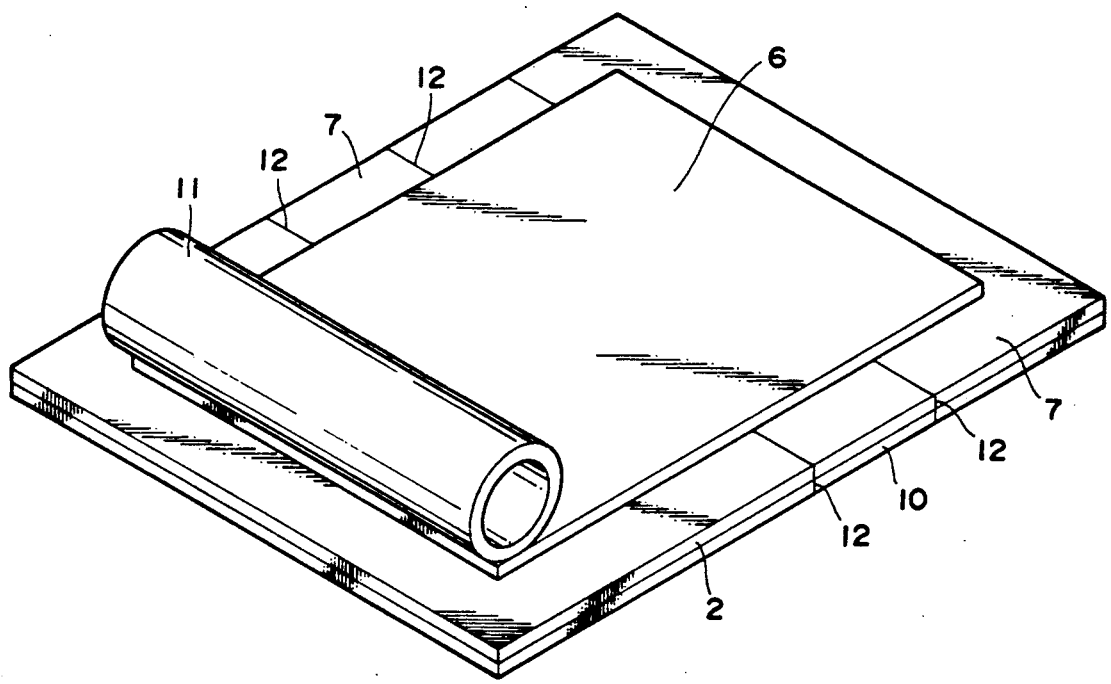
FIG. 5 is a perspective view of the adhesive body according to another embodiment of the invention showing a tubular body to be adhered with a decorative paper.

With reference to FIG. 5 showing another embodiment of the invention, an article in the form of a tube 11 is placed on the non-adhesive portion 6 and rolled along the edge lines of the non-adhesive portion 6, and then the adhesive portion 7 of the double-face adhesive sheet 2 is bent into the hollow of the tube 11. Cuts 12 are formed at intervals to facilitate the bending and adhering.

According to the method of the present invention, a double-face coated adhesive sheet 2 having an upper release paper 3 and a lower release paper 4 is prepared, the lower release paper is then peeled off to form a vacant area of the lower adhesive layer, and decorative paper 10 is adhered to the vacant area wherein a cut which confines a predetermined shape is formed on the upper release paper to form a central non-adhesive portion and a surrounding adhesive portion in which the adhesive layer of the sheet 2 is exposed. The upper release paper is peeled off at the area of the surrounding adhesive portion to expose the adhesive layer and a cubic article is positioned on the non-adhesive portion and then the surrounding adhesive portion is bent to be adhered to the cubic article. Accordingly, a correct positioning is made easily and if the cubic article is positioned inaccurately, correction can be made easily since the cubic article is positioned on the non-adhesive portion. Further, the adhesive portion which actually plays a role of adhesive action relative to the box is located inside of the box so that it does not damage in any way the decorative appearance. Furthermore, the non-adhesive portion 6 left between the cubic article 11 and the decorative paper 10 provides a suitable puff or richness of the decorative paper 10, with a desirable and soft appearance, and prevents the base pattern of the cubic article from being seen or appearing through the outermost decorative paper.

What is claimed is:

1. A method of adhering a decorative paper to a surface of a cubic structure comprising the steps of:
   preparing a double-face coated adhesive sheet having a first release paper on one surface and a second release paper on the other surface of said double-face coated adhesive sheet,
   peeling off said second release paper from said other surface of the double-face coated adhesive sheet so that an adhesive layer on said other surface is exposed,
   adhering a back surface of a decorative paper to said adhesive layer on said other surface,
   forming a cut to define a predetermined shape on said first release paper for forming a non-adhesive portion and a peripheral adhesive portion surrounding said non-adhesive portion,
   peeling off said first release paper from said double-face coated adhesive sheet at said cut portion so that said peripheral portion of said adhesive layer on said one surface of the double-face coated adhesive sheet is exposed,
   accurately positioning said cubic structure on said non-adhesive portion of said release paper to be coextensive in length therewith,
   wrapping said decorative paper about said cubic structure, and
   folding said peripheral adhesive portion of said decorative paper toward an interior portion of said cubic structure thereby adhering said decorative paper to a surface of said cubic structure.

2. A method of adhering a decorative paper to a surface of a hollow structure cmprising the steps of:
   preparing a double-face coated adhesive sheet having a first release aper on one surface and a second release paper on the other surface of said double-face coated adhesive sheet,
   peeling off said second release paper from said other surface of the double-face coated adhesive sheet so that an adhesive layer on said other surface is exposed,
   adhering a back surface of a decorative paper to said adhesive layer on said other surface,
   forming a cut to define a predetermined shape on said first release paper for forming a non-adhesive portion and a peripheral adhesive portion surrounding said non-adhesive portion,
   peeling off said first release paper from said double-face coated adhesive sheet at said cut portion so that said peripheral portion of said adhesive layer on said one surface of the double-face coated adhesive sheet is exposed,
   accurately positioning said strcuture on said non-adhesive portion of said first release paper to be coextensive in length therewith,
   wrapping said decorative paper about said structure, and
   folding said peripheral adhesive portion of said decorative paper toward an interior portion of said structure thereby adhering said decorative paper to a surface of said structure.

3. A method according to claim 2 wherein said hollow structure is a tubular structure and said method comprises:
   accurately positioning said tubular structure on said non-adhesive portion of said first release paper to be coextensive in length therewith,
   wrapping said decorative paper about said tubular structure, and
   folding said peripheral adhesive portion of said decorative paper toward an interior portion of said tubular structure thereby adhering said decorative paper to a surface of said tubular structure.

* * * * *